3,094,382
PREPARATION OF SODIUM TRIPOLYPHOSPHATE
Bernard Bigot, Grand-Quevilly, France, assignor to Compagnie de Saint-Gobain, Paris, France
No Drawing. Filed Dec. 2, 1958, Ser. No. 777,595
Claims priority, application France Dec. 4, 1957
1 Claim. (Cl. 23—107)

This invention relates to the manufacture of sodium tripolyphosphate, and particularly to a method whereby to produce the more soluble form II.

There are two principal varieties of sodium tripolyphosphate, form I which is produced at high temperature and is made by heating an intimate mixture of one mol. of monosodium orthophosphate and two mols. of disodium orthophosphate at a temperature above 470° C., and form II, called the low temperature variety, which is made by heating the same mixture below 470° C. Form I is less satisfactory to the user because of its slower rate of dissolving.

In practice, the amount of each of the two forms in the product can be determined by the calorimetric temperature rise test (T.R.T.) in which a T.R.T. of 6 indicates pure form II. However, there are difficulties in the analysis, and sometimes impurities are present, so that occasional tests show 5.7 to 5.8, although theoretically impossible.

Industrially, form II is preferred because it is quickly and perfectly soluble, but it is difficult to produce a pure product, or indeed, a product having a low content of form I, so that users consider a T.R.T. of 7, indicating about 4% of form I, to be satisfactory and 5% to be tolerable. In theory, it is only necessary to calcine the mixture of orthophosphates to below 470° C. to produce pure form II, but tests show that such products also contain form I. It is consequently the fact that calcination above 470° C. produces substantially all form I, but that calcination below 470° C. will produce form II mainly and also some form I, and frequently an unacceptable quantity thereof.

This has driven manufacturers to calcine at as low temperature as possible, usually between 280° C. and 400° C., but at those temperatures the rate of transformation is the slower as the temperature of calcination is the lower and the degree of transformation to form II is the more imperfect as the temperature is higher. This has led to the use of catalysts to aid the transformation from orthophosphates to tripolyphosphate, among which are urea, guanidine, semi-carbazide, aminophosphoric acid, ammonium nitrate, ammonia, and mineral acid and organic acid salts of ammonia such as the carbonate, oxalate, acetate and formate. These catalysts have the effect of enabling one to use the lower temperatures in the range and to reduce the amount of form I produced without wholly eliminating it.

However, particularly when wet-method phosphoric acid is used as raw material, the use of low temperatures, with or without catalysts, has the difficulty of leaving some organic matter from the orthophosphates unburned, the amount being very variable and related to the acid being used. The tripolyphosphate thus produced has a grey hue revelatory of its imperfection which is noticeable in solution. This phenomenon has led users of wet-method phosphoric acid, despite the advantages of low temperatures, to use relatively high temperatures of calcination even with the catalysts, and thereby to introduce some form I into the product.

It would be desirable to use temperatures of calcination at which all organic matter will be burned up, even though a material amount of form I is produced, provided one could transform the form I to form II in the product, but until now it has been impossible, or so slow as to be impractical, depending on the temperature, as soon as the reactions of polycondensation had attained a substantial rate in the reaction mass.

It is an object of the invention to attain this desirable end.

Another object is to transform tripolyphosphate containing a substantial quantity of form I either totally to form II, or substantially to form II, with only a low and acceptable content of form I, for instance, not over 4%.

Another object is to prepare sodium tripolyphosphate substantially free of organic matter and substantially in form I.

The objects of the invention are accomplished, generally speaking, by a process of transforming sodium tripolyphosphate of form I to form II after calcination and regardless of the conditions under which it had been prepared. The process involves heating the tripolyphosphate containing form I in the presence of certain catalysts until substantial elimination of form I and transformation of form II has been accomplished. The preferred catalysts for this novel process are water, nitric acid, and nitrates which are readily dissociated by heat, particularly ammonium nitrate. Other useful nitrates illustrative of this type are sodium nitrate, potassium nitrate, and lead nitrate. Of lesser but some utility in transforming form I to form II are salts which readily liberate a volatile anion ($SO_2$, $Cl_2$, for example) and salts which sublime (e.g. ammonium chloride). Water employed in substantial amount is an excellent catalyst; it can be added per se, or as concentrated orthophosphate liquor.

The catalysts for the reaction of polycondensation of the orthophosphates to tripolyphosphate are not generally useful in this novel transformation, e.g., ammonia and the mineral and organic salts of ammonia such as carbonates, oxalates, acetates and formates, urea, and amines and amides being useless.

The efficiency of the process is controllable by three principal variables, the proportion of catalyst used, the temperature at which the transformation is carried out, and the duration. These three variables may be employed to obtain optimum conditions and yields with whatever catalysts is selected for use.

Thus, when 2% $NH_4NO_3$ is used as the catalyst to transform I to form II, success is achieved under any of the following conditions from 6 hours heating at 200° C. to 5 minutes heating at 500° C., examples of which, for illustrative purposes are 3 hours at 250° C., 1 hour at 300° C., ½ hour at 350° C., 15 minutes at 400° C., and 10 minutes at 450° C., the range of duration being the greater as the temperature is the lower. The reduction of the amount of nitrate tends to reduce this range and indirectly to reduce the extreme limits of temperature, the heating not being continued except for the briefest time after the disappearance of the nitrate. The proportion of 0.5% may be deemed a minimum. The increase in the proportion of nitrate tends to distend the range toward increased duration and to increase the upper limit of temperature. A proportion of 5% nitrate is the useful maximum.

*Example 1*

Sodium tripolyphosphate of T.R.T.=12.1, containing about 24% of form I, was heated for 45 minutes at 300° C. in the presence of 2% $NH_4NO_3$. The final product was of T.R.T.=6.7 and contained about 3% of form I.

*Example 2*

The polyphosphate of Example 1 was heated for 3 hours at 300° C. in the presence of 2% $NH_4NO_3$, producing a T.R.T.=6. The tripolyphosphate was of pure form II.

Example 3

A sodium tripolyphosphate of T.R.T.=11.9, containing about 24% of form I, was heated for 15 minutes at 450° C. in the presence of 2% $NH_4NO_3$. The final product was of T.R.T.=6.2 and contained about 1% of form I.

Example 4

The raw material of Example 3 was heated for 15 minutes at 450° C. in the presence of 4% $NH_4NO_3$, producing pure form II. When heating was prolonged, there was reversion and reappearance of form I.

Example 5

The raw material of Example 3 was heated for 3 hours at 250° C. in the presence of 2% $NH_4NO_3$, producing a product having 5% of form I.

Example 6

A sodium tripolyphosphate of T.R.T.=12.1, containing about 25% of form I, was heated for 1½ hours at 350° C. and mixed with 2% of lead nitrate, producing T.R.T.=9, a content of 12% of form I. Thus, although the final content was not satisfactory, the process did transform over half of the form I to form II.

Example 7

A tripolyphosphate of 100% form I was heated for 2 hours at 350° C. with 2% of $NH_4NO_3$, producing a T.R.T.=6.9 and a maximum of 4% of form I.

Example 8

The raw material of Example 6 was mixed with 10% water and heated for 1½ hours at 350° C., producing a T.R.T.=6.6 and leaving 3% of form I.

In each of the foregoing examples, form II replaced form I.

The invention enables the maker to transform the entirety of form I to form II, which is surprising, considering the difficulty of producing form II uniformly by prior methods, even using low temperature and catalysts. To obtain this result by this invention, sodium tripolyphosphate, made by any method and already calcined, is subjected to simple heating in the presence of a catalyst of the kind indicated for the limited period of time specified. The duration and temperature of treatment and the proportion of catalyst should be chosen with care in each case, and, before mass production begins, laboratory tests are indicated to determine the optimum conditions applicable to the particular raw material.

A particularly advantageous form of the invention for the treatment of a calcined product derived from orthophosphates made from phosphoric acid prepared by the wet method and containing organic matter, is carried out as follows:

(a) The orthophosphates are calcined in the prior art way to the complete destruction of the organic materials, for instance at a temperature substantially above 470° C., producing essentially form I sodium tripolyphosphate;

(b) Treating the product thus produced according to the present invention to transform the form I to form II either totally or to a degree satisfactory to the trade.

The addition of the catalyst should be withheld until the start of step b, when the proper temperature has been established for transformation of form I to form II, as the addition of the catalyst during step a is not operative. This demonstrates the essential difference between this phenomenon and the catalytic processes of the prior art, in which the catalysts were used in the first stage to improve the speed of the polycondensation.

In this application of the invention it is advantageous to recover the gases employed in heating the first step as a source of heat for the second. The two stages can be used in a single apparatus in sequence, or the gases and product can be advanced in parrallel to a second apparatus, accompanied by the admittance of enough air to control the temperature of the second stage precisely, and the gases after these stages can be used in atomizers to desiccate solutions of orthophosphates.

An advantage of the invention is the continuous production of sodium tripolyphosphate which is of uniform form II content and may be wholly form II if desired. Furthermore, the process, while primarily directed to the production of products having the minimum of form I desired, can be used to reduce higher percentages of form I to whatever lower percentages are desired. The process requires low investment and simple controls and can be adapted to existing plants. The product is more uniform than was previously possible. The process is applicable to calcined products without regard to their content of form I, in any case being useful to reduce or eliminate all of form I.

As many apparently widely different embodiments of the present invention may be made without departing from the spirit and scope thereof, it is to be understood that the invention is not limited to the specific embodiments.

What is claimed is:

In a method of transforming a calcined mixture of sodium tripolyphosphate, containing a substantial quantity of form I, to form II containing not substantially more than 4% form I, the step of adding to the said mixture of form I and form II a catalytic amount of a compound from the group consisting of water, $HNO_3$, and the nitrates of ammonia, potassium, sodium, and lead, in a proportion equivalent in effect to about .5% to 5% $NH_4NO_3$, heating the resulting mixture from several minutes to several hours at temperatures varying between about 500 and 200° C. respectively, cooling the resulting reaction mass, and recovering the said polyphosphate.

References Cited in the file of this patent

UNITED STATES PATENTS

| | | |
|---|---|---|
| 2,898,189 | Rodis et al. | Aug. 4, 1959 |
| 2,920,939 | Edwards | Jan. 12, 1960 |
| 2,977,317 | Rodis et al. | Mar. 28, 1961 |

OTHER REFERENCES

Encyclopedia of Chemical Technology, Van Wazer, vol. 10, 1953, pages 413–415.

Phosphorus and Its Compounds, Van Wazer, vol. 1, Chemistry, 1958, Interscience Publishers, Inc., New York, pages 642 to 648.